UNITED STATES PATENT OFFICE.

ADOLPH SCHROEDER, OF BERLIN, GERMANY, ASSIGNOR TO ALFRED KRAUSE, OF BERLIN, GERMANY.

PROCESS OF STERILIZING AND PRESERVING SUBSTANCES.

No. 850,606.     Specification of Letters Patent.     Patented April 16, 1907.

Application filed March 29, 1904. Serial No. 200,627.

*To all whom it may concern:*

Be it known that I, ADOLPH SCHROEDER, a subject of the King of Prussia and the German Emperor, a resident of Berlin, Kingdom of Prussia, German Empire, have invented certain new and useful Improvements in Processes for Sterilizing and Preserving Substances, of which the following is a specification.

This invention relates to processes of sterilizing and preserving substances—such as food, beverages, &c.—and has for its object a process for accomplishing the above results in a more expeditious, considerably cheaper, and more reliable manner than processes at present known and which shall at the same time have no detrimental effect or action on the substances treated.

My invention consists in adding peroxids of metals to the substances to be treated and causing the decomposition of the peroxids with the formation of oxygen in the nascent state, the decomposition products resulting during the processes having no detrimental effect on the human system, and the peroxids used in this process are so selected that noninjurious and medicinal by-products will result.

I have discovered that the peroxids which are most suitable for accomplishing my invention are fixed peroxids, such as the peroxids of the alkaline earths, including magnesium. As instances I may cite peroxid of magnesium or calcium. The peroxid of magnesium in many instances is preferably used because the by-products resulting during the process are many times not only not detrimental to the human system, on the contrary, they are beneficial. If, for instance, organic acid like citric acid is present as the decomposing agent of the peroxid of magnesium citrate of magnesium will be formed, which is a medicinal substance. However, the peroxids of the earth alkali metals, such as peroxid of calcium, are full equivalents to the peroxid of magnesium for the purpose of this invention. In carrying out my invention I decompose or bring about the decomposition of these peroxids in contact with the substance to be sterilized and preserved with the formation of oxygen. The decomposition of the peroxid may be carried out by means of any substance of an acid character which is capable of effecting the decomposition of the peroxid with the formation of oxygen and which at the same time will result in a neutral inert or innoxious compound in the substance treated. As an instance carbonic acid, either gaseous or fixed in the form of a carbonate or bicarbonate, or carbonic acid in combination with a carbonate or bicarbonate, may be specified. Where the substance to be treated itself contains ingredients capable of reacting with the peroxids and forming oxygen, it will be obvious that less of one addition of a reagent to effect the decomposition of the peroxid will be necessary. Thus fruits or fruit juice or other substances containing organic acids or substances of an acid character which react with the peroxids to cause their decomposition and the formation of oxygen will require little of a reagent to decompose the peroxid.

In order to more fully explain my invention and to enable those skilled in the art to practice the same, I give the following specific examples.

Carbonated waters may be sterilized according to my invention as follows: Before the water is impregnated with the carbonic acid I may add a suitable amount of a selected peroxid—for instance, magnesium peroxid. The amount of peroxid required may be readily ascertained by the skilled operator. If, for instance, the water to be treated contain a large quantity of germs, bacteria, and such like, a relatively large amount of peroxid of magnesium will be required. If, on the other hand, the water to be treated contain a relatively small quantity of the germs, bacteria, &c., a smaller quantity of peroxid will be required. There may also be added with the peroxid, if desired, a suitable carbonate, such, for instance, as carbonate or bicarbonate of sodium. The water to be treated is, after the addition of the peroxid or of the peroxid and the carbonate, charged with carbonic acid under pressure, the water being agitated until the desired amount of carbonic acid is absorbed by the water and the peroxid or peroxid and carbonate are completely dissolved. The carbonic acid present reacts with the peroxid to liberate oxygen in active condition. This active oxygen effectively destroys the germs, bacteria, &c. The reaction may be illustrated as follows:

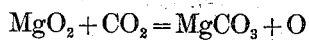

$$MgO_2 + CO_2 = MgCO_3 + O$$
$$CaO_2 + CO_2 = CaCO_3 + O.$$

It is clearly seen from the above equations that the oxygen generated is monoatomic and acts in *statu nascendi*.

The residue or by-product formed in the reaction either dissolves or is precipitated as an insoluble precipitate. The amount of this residue or by-product will depend upon the amount of carbonic acid present. The insoluble precipitate may be readily filtered out from the water.

As an instance of the proportions of the ingredients to be used I may state that for one hundred liters of water for the preparation of carbonated waters and such like one hundred grams of peroxid of magnesium (thirty per cent. $MgO_2$) or 96.42 grams of peroxid of calcium (forty per cent. $CaO_2$) may be employed.

If it be desired to sterilize and preserve liquids practically free from carbonic acid or containing only relatively small amounts thereof—such, for instance, as milk—I add a mixture of peroxid and carbonate to the liquid and heat the same at a gentle heat for a sufficient time to decompose the peroxid. This heat may be about 40° centigrade. As as example of proportions of the materials I may state that one hundred grams of peroxid of magnesium and one hundred grams of bicarbonate of sodium will serve for one hundred kilos of milk. The mixture is placed in hermetically-sealed vessels and heated for a suitable time—for example, for two hours—at a temperature of about 40° centigrade. The process may, however, be carried out at an ordinary temperature, if desired, especially in the case of liquids or substances which would be injuriously affected by heat.

In place of the organic substances of an acid character so far mentioned other substances of an acid character may be used for decomposing the peroxids. For example, I may use acid phosphates of magnesium or of calcium and with or without the aid of carbonic acid. Either the primary phosphate ($CaH_4(PO_4)_2$) or the secondary phosphate ($CaHPO_4$) of calcium may be used. If peroxid of magnesium be used, I preferably use therewith corresponding phosphates—that is, the magnesium phosphates ($MgHPO_4$ or $MgH_4(PO_4)_2 + 2H_2O$) for the purpose of effecting the decomposition.

Where milk is to be sterilized and preserved by the above treatment, the reagents are preferably added to the milk and the milk inclosed in hermetically-sealed vessels, and the reaction permitted to take place at about 18° to 20° centigrade. The mixture should be gently agitated, taking care to avoid a too great agitation, such as would cause the solidification of the fat or the formation of butter. The thorough and intimate admixture of the contents of the vessels should be effected in order that the interior surfaces of the vessels and also the air present may come into intimate contact with the milk and the reagents. As an example of proportions of reagents to be used in the sterilization and preservation of milk and to more fully explain my invention I give the following: To one hundred liters of milk seventy-five grams of peroxid of calcium (containing fifty per cent. $CaO_2$) and 178.9 grams of secondary phosphate of calcium ($CaHPO_4, 2H_2O$) are added, or instead of the latter 141.25 grams of the primary phosphate of calcium ($CaH_4(PO_4)_2, H_2O$) may be employed. When magnesium peroxid is employed, I add to one hundred liters of milk one hundred grams of magnesium peroxid (containing thirty per cent. $MgO_2$) and 439.3 grams of the secondary magnesium phosphate, or two hundred and twenty-seven grams of the primary magnesium phosphate, or 307.14 grams of the secondary calcium phosphate, or two hundred and twenty-five grams of the primary calcium phosphate. When magnesium peroxid is employed in this process, then the acid phosphate of magnesium need not necessarily be employed, although this is preferable. In fact, it would appear to be more desirable in sterilizing milk to employ acid phosphates of calcium for decomposing the magnesium peroxid.

In order to accelerate the process, pure carbonic acid may be introduced into the mixture. For instance, in the above-described example of the use of peroxid of calcium 48.8 grams of carbonic acid may be used, and in the above example for the use of peroxid of magnesium 78.5 grams of carbonic acid may be used.

When butter is to be sterilized and preserved, I add the peroxid and the phosphate, preferably peroxid of calcium, and either the secondary or primary phosphate of calcium to the butter and knead or work the reagents into the butter at the ordinary temperature for a suitable period of time, so that they will be thoroughly and uniformly incorporated therewith. The butter is then placed in suitable vessels and sealed. The proportion of reagents to be used in sterilizing butter is preferably about one-half of those given above for milk.

As before pointed out, the by-products formed during this process are not detrimental to the human system. If, for example, magnesium peroxid is decomposed within fruit-juice which contains citric acid, then some citrate of magnesia is formed, which is a medicinal substance.

Having thus described my invention, what I claim as new, and desire to secure by Letters Patent, is—

1. Process of sterilizing and preserving food substances and potable liquids consisting in generating oxygen in the nascent state within the substances to be sterilized and preserved by admixing thereto peroxid of magnesium and decomposing same by substances of an acid character which form with the peroxid non-injurious and medicinal by-products.

2. Process of sterilizing and preserving food substances and potable liquids consisting in generating oxygen in the nascent state within the substances to be sterilized and preserved by admixing thereto peroxid of magnesium and decomposing same by organic acids which form with the peroxid non-injurious and medicinal by-products.

3. The process of sterilizing and preserving substances containing germs and bacteria consisting in generating oxygen in the nascent state within the substances to be preserved by admixing therewith peroxid of magnesium and decomposing same by carbonic-acid gas.

4. Process of sterilizing and preserving food substances and potable liquids consisting in generating oxygen in the nascent state within the substances to be sterilized and preserved by admixing thereto peroxid of magnesium and decomposing same partly by organic acids normally contained in the substances to be sterilized and preserved and partly by decomposing substances of an acid character added thereto and forming non-injurious and medicinal by-products with the peroxid of magnesium.

In witness whereof I have hereunto signed my name, this 16th day of March, 1904, in the presence of two subscribing witnesses.

ADOLPH SCHROEDER.

Witnesses:
 WOLDEMAR HAUPT,
 HENRY HASPER.